United States Patent
Fukushima

(10) Patent No.: US 9,174,619 B2
(45) Date of Patent: Nov. 3, 2015

(54) MULTIPLE-MODE BRAKING SYSTEM

(71) Applicant: Robert Bosch GmbH, Stuttgart (DE)

(72) Inventor: Toshiaki Fukushima, Saitama (JP)

(73) Assignee: Robert Bosch GmbH, Stuttgart (DE)

( * ) Notice: Subject to any disclaimer, the term of this patent is extended or adjusted under 35 U.S.C. 154(b) by 465 days.

(21) Appl. No.: 13/796,981

(22) Filed: Mar. 12, 2013

(65) Prior Publication Data

US 2014/0130659 A1     May 15, 2014

Related U.S. Application Data

(60) Provisional application No. 61/726,245, filed on Nov. 14, 2012.

(51) Int. Cl.
| | |
|---|---|
| *F15B 7/00* | (2006.01) |
| *B60T 13/12* | (2006.01) |
| *B60T 8/32* | (2006.01) |
| *B60T 8/40* | (2006.01) |
| *B60T 8/44* | (2006.01) |
| *B60T 13/74* | (2006.01) |
| *B60T 11/20* | (2006.01) |

(Continued)

(52) U.S. Cl.
CPC .............. *B60T 13/12* (2013.01); *B60T 8/3265* (2013.01); *B60T 8/4077* (2013.01); *B60T 8/447* (2013.01); *B60T 13/745* (2013.01); *B60T 8/4266* (2013.01); *B60T 8/4863* (2013.01); *B60T 11/203* (2013.01)

(58) Field of Classification Search
CPC ... B60T 8/3265; B60T 8/4022; B60T 8/4077; B60T 8/477
See application file for complete search history.

(56) References Cited

U.S. PATENT DOCUMENTS

| | | |
|---|---|---|
| 2008/0284242 A1 | 11/2008 | Ganzel |
| 2009/0108672 A1 | 4/2009 | Joyce |
| 2010/0181152 A1 | 7/2010 | Anderson et al. |

(Continued)

FOREIGN PATENT DOCUMENTS

| | | |
|---|---|---|
| EP | 1795417 | 6/2007 |
| FR | 1308168 | 11/1962 |
| WO | 2012062528 | 5/2012 |

OTHER PUBLICATIONS

"Four-Wheel Dual Braking for Automobiles: All four wheels are braked by either of two master cylinders," (National Aeronautics and Space Administration, Washington, DC.), 1p, Dec. 1981.

(Continued)

*Primary Examiner* — Edward Look
*Assistant Examiner* — Daniel Collins
(74) *Attorney, Agent, or Firm* — Michael Best & Friedrich LLP

(57) ABSTRACT

An all-in-one braking system for a vehicle is described. The braking system includes an operating rod, a first piston system, a second piston system, and a fail safe plate. The operating rod is couplable to a brake actuator operated by the driver of the vehicle. The first piston system and the second piston system each include a piston, a fail recovery key, and a motor. The motor is coupled to the piston to affect lateral movement of the piston which, in turn, causes a braking pressure to be applied to a wheel of the vehicle. The fail safe plate is fixedly coupled to the operating rod such that lateral movement of the operating rod causes lateral movement of the fail safe plate. A controller is configured to operate the motors to control the lateral movement of the pistons based at least in part on detected movement of the operating rod.

15 Claims, 10 Drawing Sheets

(51) Int. Cl.
*B60T 8/42* (2006.01)
*B60T 8/48* (2006.01)

(56) References Cited

U.S. PATENT DOCUMENTS

2010/0225159 A1 9/2010 Drumm
2011/0006594 A1 1/2011 Ganzel
2011/0291469 A1 12/2011 Drumm

OTHER PUBLICATIONS

Zhou, L. et al., "Braking control of electric vehicles while coordinating regenerative and anti-lock brakes," Qinghua Daxue Xuebao/Journal of Tsinghua University, vol. 49, No. 5, pp. 728-732, May 2009.
Wang X. et al., "Fuzzy logic controller for electric vehicle braking strategy," 2007 International Conference on Power Electronics and Drive Systems (PEDS '07), 1542-7, 2007; ISBN-13: 978-1-4244-0644-9; Conference: 2007 International Conference on Power Electronics and Drive Systems (PEDS '07), Nov. 27-30, 2007.
International Search Report and Written Opinion for Application No. PCT/IB2013/002526 dated Jun. 4, 2014 (10 pages).

MULTIPLE-MODE BRAKING SYSTEM

RELATED APPLICATIONS

This application claims priority to U.S. Provisional Application No. 61/726,245 filed Nov. 14, 2012, titled "MULTIPLE-MODE BRAKING SYSTEM," the entirety of which is incorporated herein by reference.

BACKGROUND

The present invention relates to a system for operating the brakes of a vehicle. The system provides for normal braking where the same braking force is applied to each of the four wheels of the vehicle and also provides for dynamic braking where different braking forces are applied to each wheel. Examples of dynamic braking provided by the system include anti-lock braking (ABS), electronic stability (ESP), and cooperative regenerative braking (CRBS).

SUMMARY

Some existing braking systems include modulation systems, hydraulic brake booster systems, or electric motor assist booster systems. However, in such existing systems, the relation between the input stroke and the output pressure of the actuators is not changeable without an additional mechanism. The additional mechanism is sometimes provided by an artificial reaction force mechanism or a brake-by-wire system. Furthermore, when the brakes are actuated due to CRBS, ABS, or ESP in the current systems, kick back is provided from the modulation actuator. In fact, in some systems, the additional braking mechanisms actually cause the brake pedal to move without actuation from the driver of the vehicle.

In one embodiment, the invention provides a braking system where the output stroke (i.e., the braking force applied to each wheel) is separated from the input stroke (i.e., the pressure placed on the brake pedal). Embodiments of the invention also provide a compact packaging that provides for multiple braking modes. Embodiments also provide flexible pedal feel tuning that is independently tunable for both force and stroke between input and output of the braking system.

In another embodiment, the invention provides a braking system for a vehicle comprising an operating rod, a first piston system, a second piston system, and a fail safe plate. The operating rod is couplable to a brake actuator operated by the driver of the vehicle. The first piston system and the second piston system each include a piston, a fail recovery key, and a motor. The motor is coupled to the piston to affect lateral movement of the piston. Lateral movement of each piston causes a braking pressure to be applied to a different wheel of the vehicle. The fail safe plate is fixedly coupled to the operating rod such that lateral movement of the operating rod causes lateral movement of the fail safe plate. A controller is configured to operate the motors to control the lateral movement of the pistons based at least in part on detected movement of the operating rod.

In some embodiments, each fail recovery key includes a contact protrusion coupled to an actuator protrusion. When the contract protrusion is extended from the piston system, lateral movement of the fail safe plate in a first direction contacts the contact protrusion and causes the piston to move with the fail safe plate. When the fail recovery key is not engaged, the contact protrusion is retracted into the piston system.

In some embodiments, each piston system includes a cup plunger coupled to the motor. The motor affects the lateral movement of the piston by moving the cup plunger in a first direction such that the hollow end of the cup plunger receives the piston and pushes the first piston in the first lateral direction. When the cup plunger receives the piston, it depresses the actuator protrusion and the contact protrusion is retracted into the piston system. When the cup plunger does not depress the actuator protrusion, the contact protrusion extends from the piston system and the fail recovery key is engaged.

In some embodiments, the braking system further includes a first braking cylinder, a second braking cylinder, and a reaction cylinder. Lateral movement of each piston increases the pressure in the corresponding braking cylinder. Lateral movement of the operating rod increases the pressure in the reaction cylinder and provides pressure feedback to the driver through the brake pedal (i.e., the brake actuator of the vehicle). A valve positioned between the first braking cylinder and the reaction cylinder. When the valve is opened, increased pressure in the first braking cylinder causes increased pressure in the reaction cylinder. The valve is opened when the brake actuator is engaged by the driver (i.e., when the brake pedal is depressed). When the valve is closed, changes in pressure in the first braking cylinder do not affect the pressure in the reaction cylinder. The valve is closed when the brake actuator is not engaged by the driver (i.e., when the brake pedal is not depressed). In some constructions, the valve can also be closed when vehicle systems such as anti-lock braking or electronic stability control systems modify the operation of the vehicle brakes.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
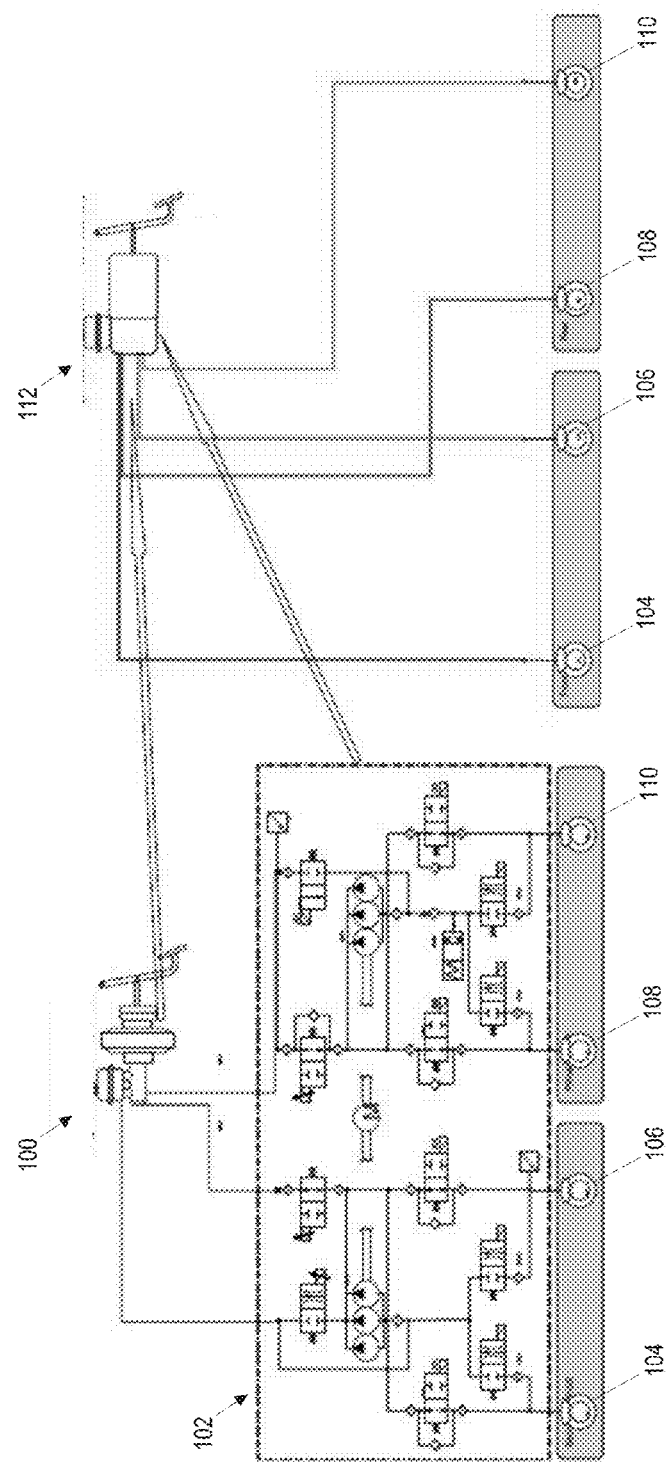
FIG. 1A is a schematic illustration of one example of a braking system that includes additional mechanisms for implementing dynamic braking functionality.
FIG. 1B is a schematic illustration of another embodiment of a braking system.

FIG. 1A illustrates an example of an existing braking system 100. The output of the braking system 100 is modified by a series of controlled valves, reservoirs, cylinders, and electronics (collectively noted as 102) to provide dynamic braking functionality such as electronic stability (ESP) and anti-lock braking (ABS). The modified output of the primary braking system 100 provides braking pressure that is then applied to each wheel of the vehicle 104, 106, 108, and 110. In contrast, FIG. 1B illustrates one construction of the braking system 112 that is described in detail below. The outputs of the braking system 112 are provided directly from the braking system 112 to each wheel of the vehicle 104, 106, 108, and 110 to provide standard symmetrical braking or dynamic braking mechanisms such as ESP and ABS.

Figure 2:
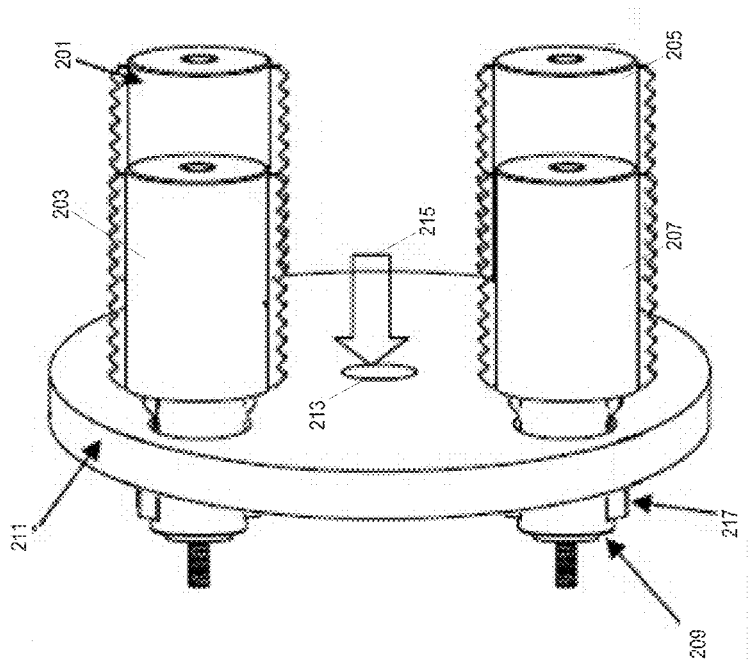
FIG. 2 is a partial prospective view of the braking system of FIG. 1B.

As shown in FIG. 2, the all-in-one braking system of FIG. 1B includes a series of four rack plungers 201, 203, 205, and 207 each operated by a separate motor control. Each rack plunger 201, 203, 205, 207 is positioned to push a corresponding piston (such as piston 209) which extends through a fail safe plate 211. The fail safe plate 211 is fixedly coupled to an operating rod (not shown in FIG. 2) at hole 213. The operating rod is coupled to the brake pedal of the vehicle such that when the brake pedal is depressed, the operating rod and the fail safe plate 211 move in a first lateral direction 215. As described in further detail below, a spring is positioned to automatically move the operating rod and the fail safe plate 211 in a direction opposite the first lateral direction 215 and return it to its original position when the brake pedal is not depressed.

Each piston push rod assembly 209 includes a fail recovery key. The fail recovery key includes a contact protrusion 217 that extends and retracts from the piston push rod assembly 209. When the fail recovery key is engaged, the contact protrusion 217 extends from the piston push rod 209. When the contact protrusion 217 is extended, lateral movement of the operating rod and the fail safe plate 211 in the first lateral direction 215 causes the fail safe plate 211 to contact and apply a force on the contact protrusion 217. By pushing the extended contact protrusion, the piston push rod 209 is mechanically coupled to the operating rod when the fail recovery key is engaged and the contact protrusion 217 is extended. As such, the piston push rod assembly 209 moves in the lateral direction 215 with the operating rod and the fail safe plate 211.

However, when the fail recovery key is not engaged and the contact protrusion 217 is retracted, lateral movement of the fail safe plate 211 in the first direction 215 does not push the piston push rod assembly 209. As such, when the fail recovery key is not engaged, each motor-controlled piston push rod assembly 209 is free to move independent of the operating rod and the fail safe plate 211.

Figure 3:
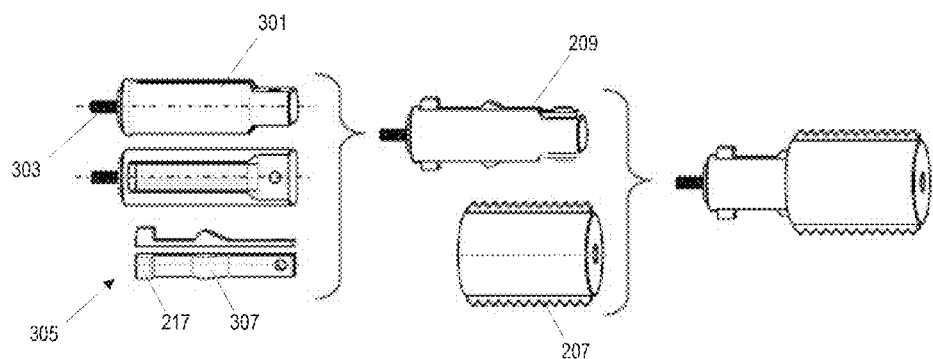
FIG. 3 is an exploded view of a piston push rod assembly of the braking system of FIG. 1B with a fail recovery key.

FIG. 3 illustrates the individual components and arrangement of components in each piston push rod assembly 209. A recovery key housing 301 is connected to the terminal end of the piston push rod 303. A pair of recovery keys 305 are positioned within each recovery key housing 301. Each recovery key includes a contact protrusion 217 and an actuator protrusion 307. The assembled piston push rod assembly 209 is positioned inside a hollow end of the cup-shaped rack plunger 207. As described in further detail below, when a motor causes the rack plunger 207 to move in the first lateral direction (direction 215 in FIG. 2), the rack plunger receives the piston push rod assembly 209 until the inner surface of the rack plunger 207 contacts the piston push rod assembly 209 and begins to push the piston push rod assembly 209 in the first lateral direction 215. As described in further detail below, a spring is positioned to push the piston push rod assembly 209 in a direction opposite the first lateral direction 215. As such, when the motor retracts the rack plunger 207, the piston push rod assembly 209 returns to its original position.

Figure 4A:
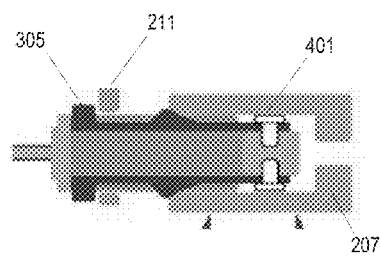
FIGS. 4A and 4B are cross-sectional illustrations of the motor-operated piston push rod assembly of FIG. 3 with the fail recovery key engaged and disengaged.

Movement of the rack plunger 207 also controls the engagement and disengagement of the fail recovery keys 305. As illustrated in FIG. 4A, one end of each fail recovery key is coupled to an inner surface of the fail recovery key housing 301 by fastener 401. The other end of the fail recovery key 305 is not fixed to the fail recovery key housing 301 and, instead, is free to move perpendicular to the first lateral direction 215 when acted upon by a force. As shown in FIG. 4A, when the rack plunger 207 is retracted and is not positioned to push the piston push rod assembly 209, the hollow end of the rack plunger 207 does not extend beyond the actuator protrusion 307 of the fail recovery key 305. As such, both the actuator protrusion 307 and the contact protrusion 217 extend from the fail recovery key housing 301 and the fail recovery key 305 is engaged. Lateral movement of the fail safe plate 211 in the first direction 215 would push the contact protrusion 217 of the fail recovery key 305 and force the piston push rod assembly 209 to move with the fail safe plate 211 and the operating rod in the first lateral direction 215.

Figure 4B:
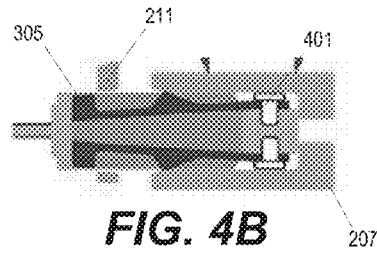

In FIG. 4B, the corresponding motor has moved the rack plunger 207 in the first lateral direction 215 and the rack plunger 207 is beginning to push the piston push rod assembly 209 in the first direction 215. With the piston push rod assembly 209 fully received by the rack plunger 207, the hollow end of the rack plunger 207 now extends beyond the actuator protrusions 307 of the fail recovery keys 305. As a result, the actuator protrusions 307 are pushed into the fail recovery key housing 301 causing the contact protrusions 217 to also retract into the fail recovery key housing 301. The fail recovery key is disengaged in FIG. 4B and movement of the fail safe plate 211 does not force the piston push rod assembly 209 to move in the first lateral direction 215. Instead, in FIG. 4B, the movement of the piston push rod assembly 209 is controlled only by the motor-controlled movement of the rack plunger 207.

The fail recovery key 305 described above is passively engaged—the fail recovery key 305 is engaged (i.e., FIG. 4A) unless the rack plunger 207 is pushed into a position to disengage the fail recovery key 305 (FIG. 4B). In many of the braking strategies described below, the fail recovery key 305 is first disengaged and then each piston push rod 303 is controlled independently by a motor. However, in the event of a power loss or other a failure of the motor, the braking system may not be capable of operating the motor to affect lateral movement of one or more of the piston push rod assemblies.

Because they are passively engaged, the fail recovery keys 305 remain engaged if the motor is incapable of moving the piston push rod. Under such circumstances, lateral movement of the operating rod causes the fail safe plate 211 to contact the contact protrusion 217 of the fail recovery key 305 and push the piston push rod assembly 209 in the first lateral direction. As such, if one or more motor is incapable of causing movement of its corresponding piston push rod assembly 209, the braking system reverts to mechanical operation where movement of the operating rod and the fail safe plate 211 directly causes movement of the piston push rod assembly 209.

Figure 5:
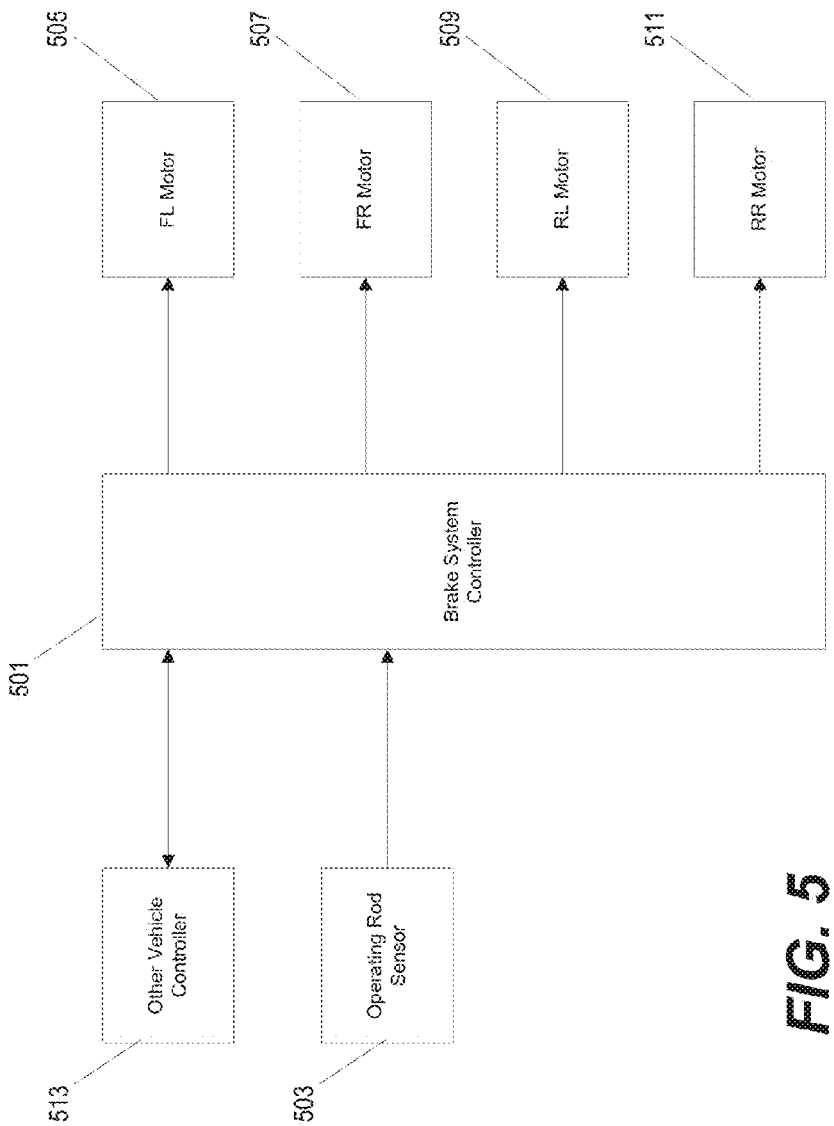
FIG. 5 is a block diagram of a control system for a brake system controller.

The operation of the braking system is controlled by a controller 501 as illustrated in FIG. 5. The controller 501 in this example includes a processor and a memory for storing instructions to be executed by the processor. However, in other constructions, the controller 501 may be implemented in other ways including, for example, as an ASIC. In this example, the brake system controller 501 receives information regarding the lateral movement of the operating rod from an operating rod sensor 503. The brake system controller 501 then controls the operation of four motors 505, 507, 509, and 511 based at least in part on the input from the operating rod sensor 503. Each motor controls the lateral position of a rack plunger 207 which, in turn, affects the lateral movement of a piston push rod assembly 209 and applies a braking force to a vehicle wheel. In this example, motor 505 controls the braking force applied to the front-left wheel of the vehicle, motor 507 controls the braking force of the front-right wheel, motor 509 controls the braking force of the rear-left wheel, and motor 511 controls the braking force of the rear-right wheel.

As described in detail below, the brake system controller 501 can be tuned to customize the relationship between the stroke of the operating rod and the stroke of each piston push rod. As such, a driver can define how much pressure is required on the brake pedal in order to apply a desired braking pressure based on user preference, body size of the driver, or other factors. Furthermore, the brake system controller 501 communicates with other vehicle control systems to coordinate the braking applied to the vehicle. For example, controller 513 may include a stability control system or an anti-lock brake system. Based on information from controller 513, the brake system controller 501 can operate the motors according to more dynamic control strategies.

The arrangement illustrated in FIG. 5 is only one example of a control system for the braking system described herein. For example, instead of including a dedicated braking controller, the system can receive motor control inputs directly from a vehicles's engine control unit. Alternatively, the brake system controller 501 can be configured to receive inputs from various vehicle sensors—either directly or through a CAN bus—and implement anti-lock braking or other dynamic braking strategies directly without input or instructions from another controller.

Figure 6:
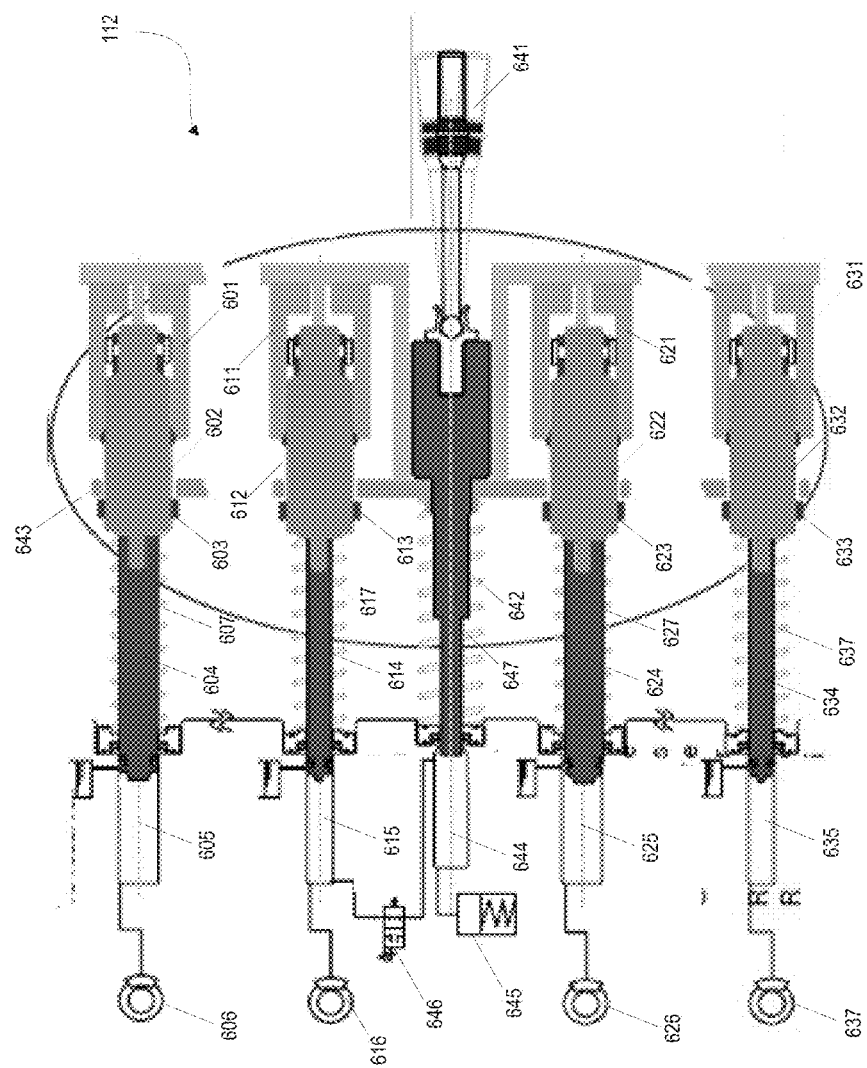
FIG. 6 is a schematic illustration of the braking system of FIG. 1B.

FIG. 6 is a schematic illustration of the braking system 112. This schematic illustration will be used below to illustrate how various braking strategies are implemented by the braking system 112. The brake system 112 includes four motor-controlled rack plungers 601, 611, 621, and 631, each of which is positioned to receive a fail recovery key housing 602, 612, 622, or 623 and affect the lateral movement of a piston push rod 604, 614, 624, or 634. Lateral movement of each piston push rod 604, 614, 624, and 624 causes an increase in pressure in a corresponding braking cylinder 605, 615, 625, or 635. The pressure in each braking cylinder 605, 615, 625, and 635 affects the braking pressure applied to a corresponding wheel 606, 616, 626, or 636 of the vehicle. As described above, lateral movement of each rack plunger 601, 611, 621, and 631 also controls whether each fail recovery key 603, 613, 623, 633 is engaged or disengaged. Each piston push rod assembly in the braking system 112 is spring mounted within the braking system so that, when the rack plunger 601, 611, 621, or 631 is retracted, the spring 607, 617, 627, or 637 pushes the piston push rod assembly in a direction opposite the first lateral direction 215 and returns the corresponding piston push rod assembly to its original position.

Figure 7:
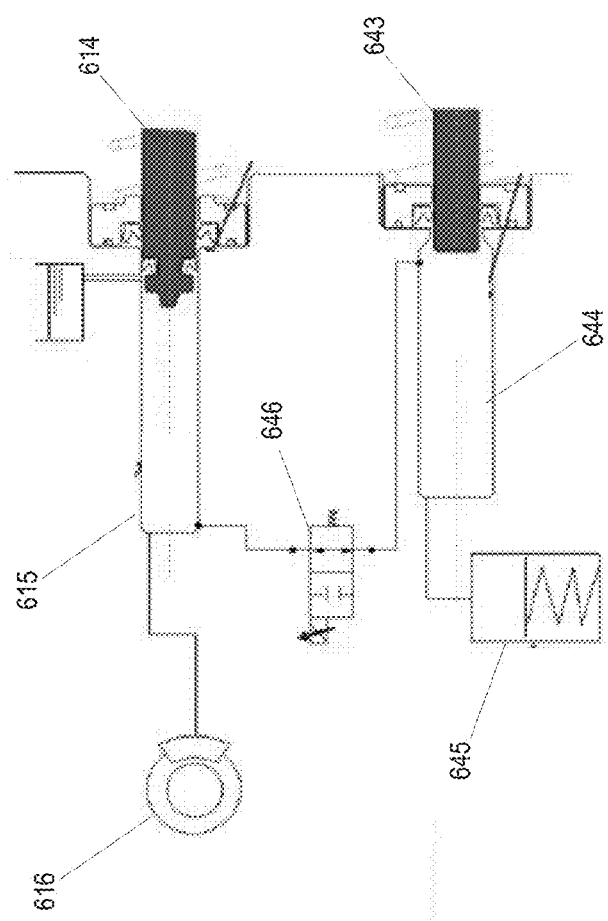
FIG. 7 is a schematic illustration of the force feedback system of the brake system of FIG. 1B.

In the braking system 112 of FIG. 6, the brake pedal 641 of the vehicle is coupled to the operating rod 642 of the braking system 112. The operating rod 642 is fixedly coupled to the fail safe plate 643. Lateral movement of the operating rod 642 increases the pressure in the reaction cylinder 644. The reaction cylinder 644 is connected to accumulator 644 and valve 646 which connects the reaction cylinder 644 to braking cylinder 615. FIG. 7 further illustrates the and accumulator 645 provide increasing resistance to the lateral movement of the operating rod 642. Furthermore, valve 646 is controllably opened to couple braking cylinder 615 to the reaction cylinder 644 in order to provide braking force feedback to the driver of the vehicle through the brake pedal. The operating rod 642 is also spring mounted such that spring 647 pushes the operating rod 642 back to its original position when the brake pedal 641 is not depressed.

FIG. 7 illustrates the valve 646 connecting the reaction cylinder 644 to the braking cylinder 615 in greater detail. As noted above, lateral movement of the operating rod 643 increases the pressure in the reaction cylinder 644. An accumulator 645 is also employed to control an increase in force/resistance felt by the driver of the vehicle when operating the brake pedal. However, the reaction cylinder 644 and the accumulator 645 alone are only able to provide force feedback through the brake pedal based on the stroke and position of the operating rod.

In order to provide force feedback/resistance to the brake pedal that is indicative of actual brake pressure applied to the wheels of the vehicle, valve 646 can be controllably opened and closed to link the reaction cylinder 644 to the braking cylinder 615. When the valve 646 is opened, an increase in pressure in the braking cylinder 615 causes an increase in pressure in the reaction cylinder 644 that, in turn, causes a greater resistance to movement of the operating rod 643. As such, in some circumstances, the valve 646 can be opened such that braking pressures applied by the controller (i.e., cruise control, electronic stability control, etc.) are manifested in the form of increased resistance to movement of the brake pedal. However, in other circumstances, the valve 646 can be closed such that braking pressures applied by the controller do not result in increased resistance to movement of the brake pedal.

Figure 8B:
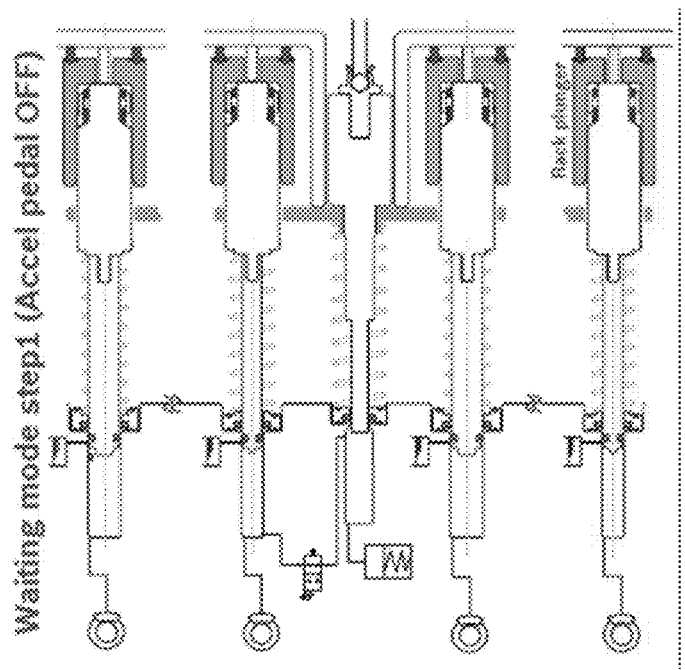
FIGS. 8A-8D are schematic illustrations of the braking system of FIG. 1B during normal braking operation.
Figure 8A:
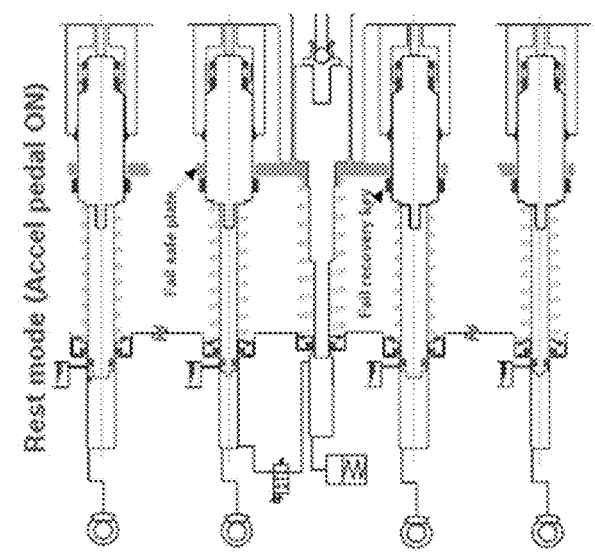

FIGS. 8A-8D illustrate one example of operation of the braking system 112 using the schematic diagram of FIG. 6 described above. FIGS. 8A-8D illustrates normal operation of the braking system in which braking pressure is applied to each wheel of the vehicle based on lateral movement of the operating rod (i.e., actuation of the brake pedal in the vehicle). FIG. 8A illustrates the system in a "rest mode." The system is in rest mode when the driver is depressing the accelerator pedal. The rack plungers are retracted and the fail recovery keys are engaged.

When the driver removes her foot from the accelerator pedal (but before the driver depresses the brake pedal), the system enters a "waiting mode." As illustrated in FIG. 8B, in the waiting mode, the controller operates the motors to move the rack plungers into contact with the piston push rod assemblies. As described above, moving the rack plungers into this position causes the fail recovery keys to disengage. While still in the "waiting mode," the rack plungers push the piston push rod assemblies a defined distance in the first lateral direction to account for dead stroke of the braking cylinders. When the dead stroke is removed, movement of the piston push rods the braking system immediately causes braking pressure to be applied to the wheels.

Figure 8D:
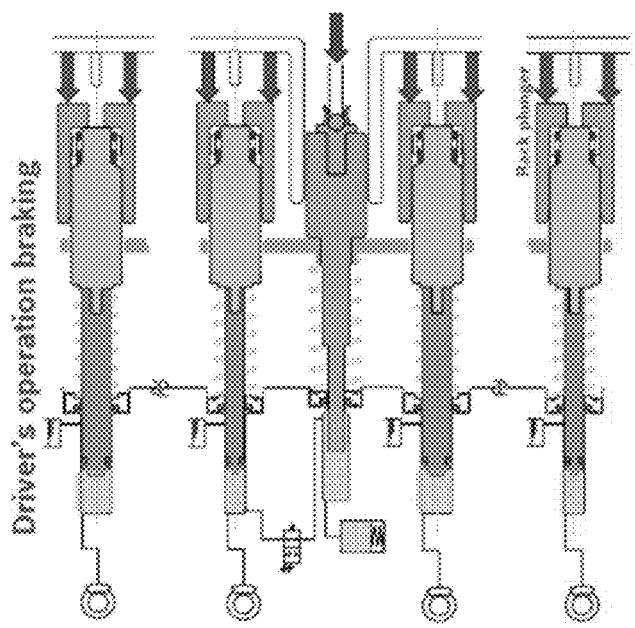
Figure 8C:
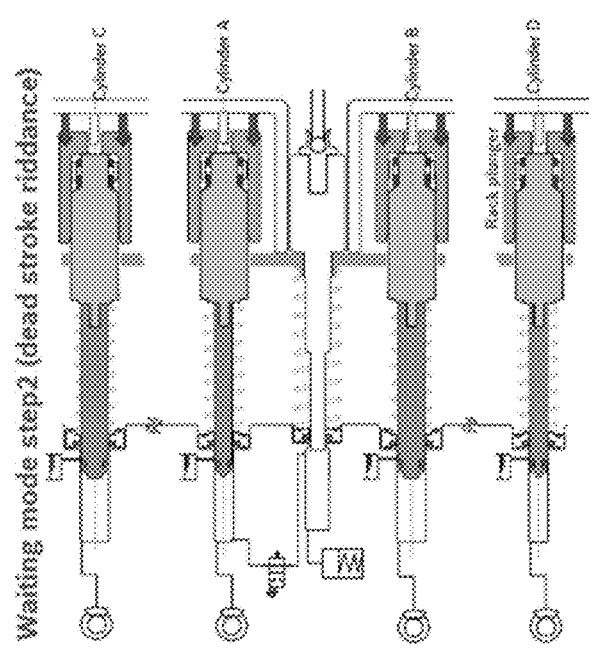

In FIG. 8D, the driver has depressed the brake pedal in the vehicle and caused lateral movement of the operating rod. As discussed above, the brake system controller detects movement of the operating rod and operates the four motor to cause lateral movement of each piston push rod. Because the fail recovery keys are disengaged at this stage, the operating rod is not mechanically linked to the piston push rods and the stroke of the piston push rods is not directly linked to the stroke of the operating rod. As illustrated in FIG. 8D, the controller has caused less lateral movement of the piston push rods as compared to the lateral movement of the operating rod. As noted above, the sensitivity of the braking system can be tuned for a particular vehicle or individual users such that more or less movement of the operating rod is required to cause the same braking pressure to be applied to the wheels.

Figure 10:
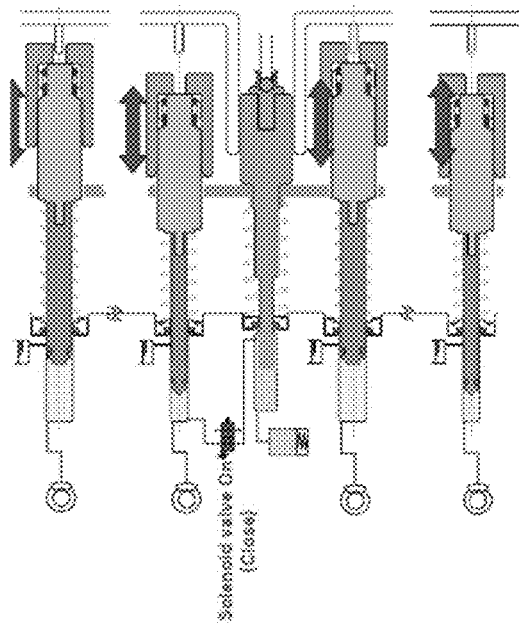
FIGS. 9 and 10 are a schematic illustrations of the braking system of FIG. 1B during dynamic braking operation such as ABS, ESP, or CRBS.
Figure 9:
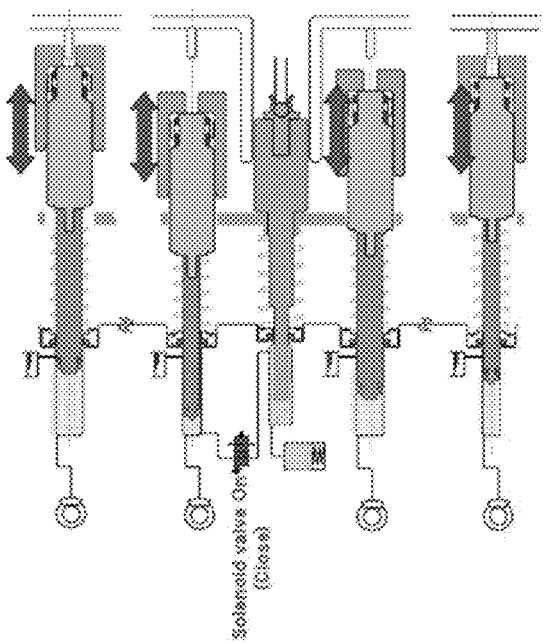

During normal braking, the braking force applied to each wheel is directly related to the pressure and stroke applied to the brake pedal (even though, as noted above, the degree of that relationship can be tuned through the controller). However, in other circumstances, the braking applied to one or more wheels may not be directly related to the stroke of the brake pedal. For example, anti-lock braking systems (ABS), electronic stability control (ESP) systems, and regenerative braking operations can be implemented by adjusting the individual brakes asymmetrically. As illustrated in FIGS. 9 and 10, the all-in-one braking mechanism allows the pressure of each cylinder (each corresponding to an individual wheel brake) to be controlled independently by one of the four cylinder motors. Furthermore, as also noted above, the valve between the braking cylinder and the reaction cylinder can be closed to prevent movement of the braking piston from providing reaction force feedback or from moving the brake pedal.

Figure 11B:
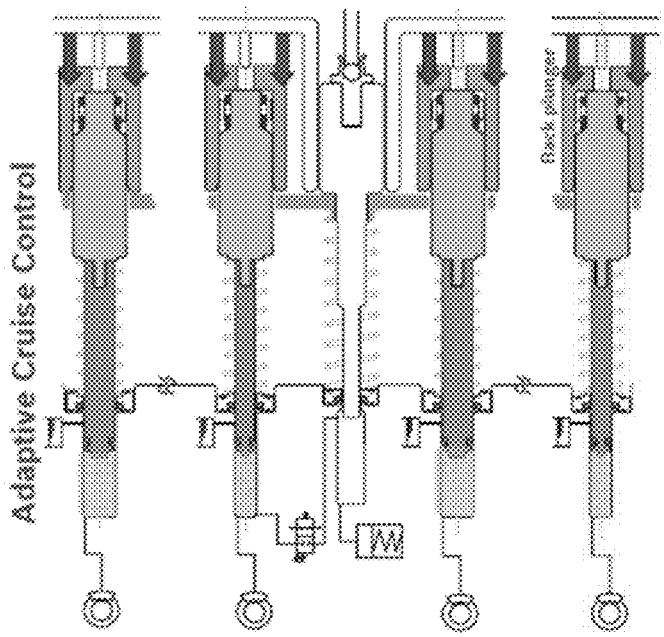
FIGS. 11A and 11B are schematic illustrations of the braking system of FIG. 1B during adaptive cruise control braking.
Figure 11A:
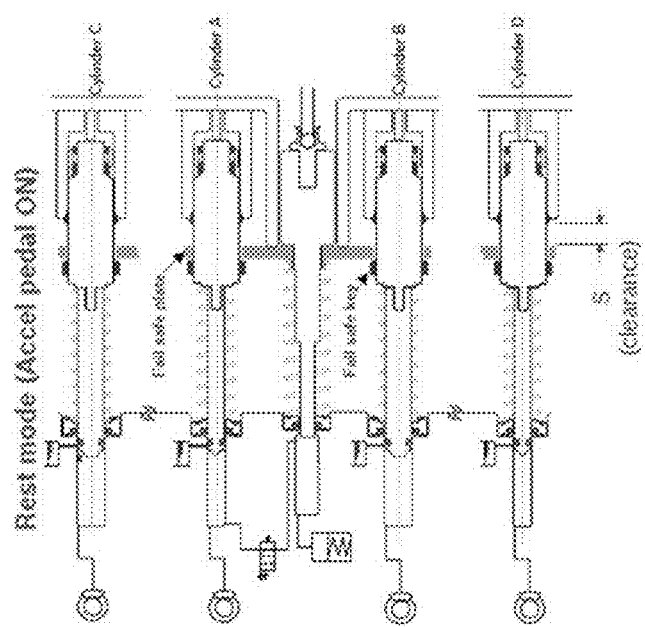

Independent control of the piston push rods can also be utilized to implement adaptive cruise control system. As illustrated in FIGS. 11A and 11B, the operation of the braking system under adaptive cruise control is similar to the normal operation of the braking system illustrated in FIGS. 8A-8D. As shown in FIG. 11A, when the cruise control system is causing the vehicle to accelerate, the braking system is placed in the "rest mode" where the rack plungers are retracted and the fail recovery keys are engaged. When the cruise control system applies a braking force, the rack plungers are advanced and the fail recovery keys are disengaged as illustrated in FIG. 11B. Unlike during the normal braking operation discussed above, the piston push rods can be operated by the controller to provide braking pressure without movement of the operating rod.

However, in some cases, movement of the brake pedal is desired when the adaptive cruise control system applies significant braking pressure. As illustrated in FIG. 11A, when in the "rest mode," there is a clearance distance "S" between the hollow end of the rack plungers and the fail safe plate. If the movements of the piston push rods required by the adaptive cruise control remain within the clearance distance "S," then the operating rod and the brake pedal are not moved. However, if the braking force called for by the adaptive cruise control system requires the piston push rods to move beyond the clearance distance "S," then the hollow end of the rack plunger contacts and pushes the fail safe plate resulting in movement of the operating rod and the brake pedal. Furthermore, although movement of the operating rod caused by excessive movement of a rack plunger is described here in the context of an adaptive cruise control, in some constructions of the braking system, any movement of at least one rack plunger in excess of the clearance distance "S" will push the fail safe plate and cause movement of the brake pedal in the vehicle.

Thus, the invention provides, among other things, a braking system that allows for independent control of the individual braking cylinders associated with each wheel. As such, a single mechanism can be used to provide uniform or asymmetric braking for a vehicle. Furthermore, braking applied by advanced dynamic control systems to not directly affect pedal feel or cause movement of the brake pedal.

Although, in the examples provided above, the braking system is described in the context of a four-wheeled vehicle—such as a car—with a brake pedal and an accelerator pedal, the braking system can be implemented in a variety of other vehicle. For example, the system can be coupled to a brake actuator such as a hand-operated brake instead of a brake pedal. Furthermore, the system can be implemented in vehicle with more or less than four wheels including two-wheeled motor cycles and vehicles with controllable trailer brakes. Similarly, hybrid braking systems can be implemented where one or more wheel brakes are operated by the motor-controlled piston push rod assemblies including a fail recovery key while one or more of the other wheel brakes are mechanically coupled to the operating rod and the brake actuator of the vehicle.

Various features and advantages of the invention are set forth in the following claims.

What is claimed is:

1. A braking system for a vehicle comprising:
    an operating rod couplable to a brake actuator operated by a driver of the vehicle;
    a first piston system including a first piston, a first fail recovery key, and a first motor, wherein the first motor is coupled to the first piston to affect lateral movement of the first piston and wherein lateral movement of the first piston applies a braking pressure to a first wheel of the vehicle;
    a second piston system including a second piston, a second fail recovery key, and a second motor, wherein the second motor is coupled to the second piston to affect lateral movement of the second piston and wherein lateral movement of the second piston applies a braking pressure to a second wheel of the vehicle;
    a fail safe plate fixedly coupled to the operating rod such that lateral movement of the operating rod causes lateral movement of the fail safe plate; and
    a controller configured to operate the first motor to control the lateral movement of the first piston and operate the second motor to control the lateral movement of the second piston based at least in part on detected movement of the operating rod,
    wherein, when the first fail recovery key is engaged, the first piston is mechanically coupled to the fail safe plate and lateral movement of the operating rod causes lateral movement of the first piston, and wherein, when the second fail recovery key is engaged, the second piston is mechanically coupled to the fail safe plate and lateral movement of the operating rod causes lateral movement of the second piston.

2. The braking system of claim 1, wherein the first fail recovery key includes a contact protrusion that extends from the first piston system when engaged and retracts into the first piston system when not engaged, and wherein lateral movement of the fail safe plate in a first direction causes the fail safe plate to apply a force to the contact protrusion causing the first piston to move with the fail safe plate.

3. The braking system of claim 2, wherein the first fail recovery key further includes an actuator protrusion coupled to the contact protrusion,
    wherein the first piston system further includes a first cup plunger coupled to the first motor, wherein the first motor affects lateral movement of the first piston in a first direction by moving the first cup plunger in the first direction such that the first piston is received by a hollow end of the first cup plunger and pushes the first piston in the first lateral direction, wherein, when the hollow end of the first cup plunger receives the first piston, the actuator protrusion is depressed by the first cup plunger and the contact protrusion is retracted into the first piston system, and wherein, when the hollow end of the first cup plunger does not depress the actuator protrusion, the contact protrusion extends from the first piston system and the first fail recovery key is engaged.

4. The braking system of claim 3, wherein, when power to the first motor is lost, the first cup plunger does not move in the first direction and does not depress the first actuator protrusion.

5. The braking system of claim 1, further comprising a first braking cylinder and a second braking cylinder, wherein lateral movement of the first piston in a first direction increases pressure in the first braking cylinder and lateral movement of the second piston in the first direction increases pressure in the second braking cylinder.

6. The braking system of claim 5, further comprising:
a reaction cylinder, wherein lateral movement of the operating rod in a first direction increases pressure in the reaction cylinder; and
a first valve between the first braking cylinder and the reaction cylinder, wherein, when the first valve is opened, increased pressure in the first braking cylinder causes increased pressure in the reaction cylinder, and, when the first valve is closed, increased pressure in the first braking cylinder does not affect the pressure in the reaction cylinder.

7. The braking system of claim 6, wherein increased pressure in the second braking cylinder does not affect the pressure in the reaction cylinder.

8. The braking system of claim 6, wherein the controller is configured to open the first valve when the brake actuator has been engaged by the driver of the vehicle.

9. The braking system of claim 6, wherein the controller is configured to close the first valve when the brake actuator is not engaged by the driver of the vehicle.

10. The braking system of claim 6, wherein the controller is configured to close the first valve when the braking system is applying a braking force due to a stability control system.

11. The braking system of claim 1, wherein the controller is further configured to:
engage the first fail recovery key and the second fail recovery key when an accelerator of the vehicle is engaged, and
disengage the first fail recovery key and the second fail recovery key when the accelerator of the vehicle is disengaged.

12. The braking system of claim 11, wherein the controller is further configured to automatically adjust for dead stroke of the braking system by advancing the first piston and the second piston in a first lateral direction after the accelerator of the vehicle is disengaged by the driver of the vehicle and before the brake actuator has been engaged by the driver of the vehicle.

13. The braking system of claim 1, wherein the first fail recovery key is engaged when a failure of the first motor occurs, and wherein the second fail recovery key is engaged when a failure of the second motor occurs.

14. The braking system of claim 9, wherein the failure of the first motor includes a loss of power to the first motor.

15. The braking system of claim 1, further comprising:
a third piston system including a third piston, a third fail recovery key, and a third motor, wherein the third motor is coupled to the third piston to affect lateral movement of the third piston, wherein lateral movement of the third piston applies a braking pressure to a third wheel of the vehicle, and wherein, when the third fail recovery key is engaged, the third piston is mechanically coupled to the fail safe plate and lateral movement of the operating rod causes lateral movement of the third piston; and
a fourth piston system including a fourth piston, a fourth fail recovery key, and a fourth motor, wherein the fourth motor is coupled to the fourth piston to affect lateral movement of the fourth piston, wherein lateral movement of the fourth piston applies a braking pressure to a fourth wheel of the vehicle, and wherein, when the fourth fail recovery key is engaged, the fourth piston is mechanically coupled to the fail safe plate and lateral movement of the operating rod causes lateral movement of the fourth piston.

* * * * *